(No Model.)

E. H. REED.
WRENCH.

No. 578,421. Patented Mar. 9, 1897.

Edwin H. Reed INVENTOR

WITNESSES:

UNITED STATES PATENT OFFICE.

EDWIN H. REED, OF OMAHA, NEBRASKA.

WRENCH.

SPECIFICATION forming part of Letters Patent No. 578,421, dated March 9, 1897.

Application filed February 1, 1896. Serial No. 577,756. (No model.)

*To all whom it may concern:*

Be it known that I, EDWIN H. REED, a citizen of the United States, residing at Omaha, in the county of Douglas and State of Nebraska, have invented a new and useful machine or stay-bolt chuck or wrench for screwing in stay-bolts or other round iron, either by a machine or hand, of which the following is a specification.

My invention relates to a new and improved stay-bolt chuck or wrench for screwing in stay-bolts in locomotive and other boilers where round iron is used for bolts.

The objects of my invention or improvement are, first, to provide a quick and firm grip of the bolt for screwing it into the boiler; second, for the immediate release of the chuck from the bolt when screwed to the desired place. I attain these objects by the mechanism illustrated in the accompanying drawing, in which—

Figure 1:
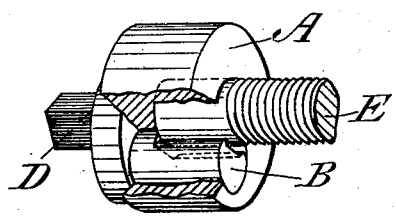
Figure 2:
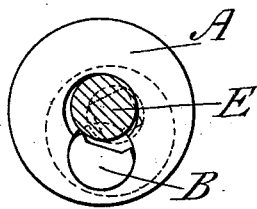
Figure 3:
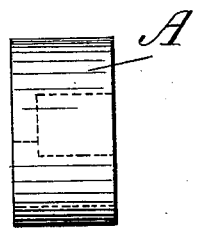
Figure 4:
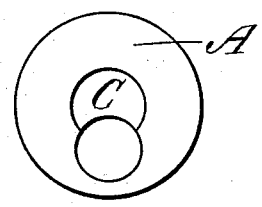
Figure 5:
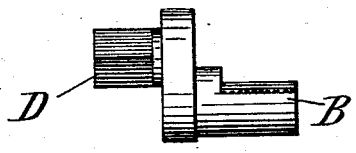
Figure 6:
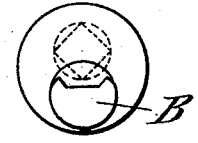

Figure 1 is a horizontal view of the entire chuck with a section removed, showing the interior. Fig. 2 is an end view of the same. Fig. 3 is a side elevation of the body or case of the chuck. Fig. 4 is an end view of Fig. 3. Figs. 5 and 6 are different views of the same piece which works in connection with Fig. 3 and accomplishes the desired result.

Similar letters refer to similar parts throughout the several views.

A represents the case or body of the chuck.

B represents a crank or cam made as shown in Figs. 5 and 6 and fitted loosely to case A, as shown in Figs. 1 and 2.

C is a recess in case A, as shown in Fig. 4.

D represents a square on Figs. 5 and 1. This square is for the purpose of attaching power either by machine or otherwise.

E is a portion of a stay-bolt or stud which the chuck is intended to hold during the process of screwing into the boiler or other desired places. This stay-bolt E is set into recess C, as shown in Fig. 1, but has nothing to do with the making or construction of the chuck.

The chuck is intended to work as follows: Cam or crank B, as shown in Figs. 5 and 6, is fitted loosely into case A, as shown in Figs. 1 and 2. When thus placed in position, as shown in Figs. 1 and 2, the center of square D is so made as to come in line with the center of recess C. The chuck in this position is slipped over stay-bolt E, and works as follows: When power is attached to square D in a rotary motion, it turns crank or cam B in its place in case A and brings one of the two points on cam B against stay-bolt or stud E, which presses the same against the opposite side of recess C. In this position the stay-bolt is held firmly, as shown in Fig. 2, and will remain so until the power is released from square D. Cam B is designed and intended so that either one of the points on the same may come in contact with stay-bolt E. In case a bolt is desired to be unscrewed, or a bolt with left-hand thread inserted, all that is necessary in either case would be to reverse the rotary power on square D, as the chuck is designed to work either way.

I am well aware that it is not new, broadly, to construct a tool having a nipping-pawl and housing, as is shown in Patent No. 453,537, issued June 2, 1891, to F. G. and F. H. Bates; but What I do claim as new, and desire to secure by United States Letters Patent, is—

The combination with a stock provided with an opening passing through the same and a crescent-shaped seating communicating with said opening, and a clutch comprising a stop in the form of a disk, having a projecting operating-stem connected to said disk extending from one side, and a crescent-shaped clutching-nib eccentrically positioned and extending from the opposite side, said nib being adapted to work into said seating.

EDWIN H. REED.

Witnesses:
   W. H. RUSSELL,
   J. B. MCKITRICK.